United States Patent [19]

Johnson

[11] 4,268,146
[45] May 19, 1981

[54] CAMERA WITH FOLDING FLASH UNIT

[75] Inventor: Bruce K. Johnson, Andover, Mass.

[73] Assignee: Polaroid Corporation, Cambridge, Mass.

[21] Appl. No.: 54,598

[22] Filed: Jul. 3, 1979

[51] Int. Cl.³ .................. G03B 15/05; G03B 17/04; E05D 11/10; E05D 15/50

[52] U.S. Cl. ................................ 354/145; 16/143; 16/145; 16/147; 16/DIG. 13; 354/187

[58] Field of Search ........ 354/126, 145, 288, 187-194; 362/10, 3; 16/143, 145, 147, DIG. 13; 220/335, 337, 338

[56] References Cited

U.S. PATENT DOCUMENTS

| | | | |
|---|---|---|---|
| 2,388,995 | 11/1945 | Pollock | 354/126 |
| 2,688,071 | 8/1954 | Wright | 362/17 |
| 2,783,696 | 3/1957 | Sewig | 354/126 |
| 2,871,775 | 2/1959 | Van der Mei | 354/129 |
| 3,240,923 | 3/1966 | Traut et al. | 362/8 |
| 3,286,611 | 11/1966 | Lange | 354/149 |
| 3,589,253 | 6/1971 | Erlichman | 354/187 |
| 3,813,004 | 5/1974 | Andreaggi | 220/96 |
| 4,072,964 | 2/1978 | Pope et al. | 354/33 |
| 4,085,414 | 4/1978 | Burgarella et al. | 354/145 |
| 4,104,660 | 8/1978 | Norris | 354/171 |
| 4,106,037 | 8/1978 | Nakamura et al. | 354/288 X |
| 4,132,471 | 1/1979 | Svatek et al. | 354/126 X |
| 4,181,415 | 1/1980 | Uchiyama et al. | 354/145 X |

FOREIGN PATENT DOCUMENTS

| | | | |
|---|---|---|---|
| 847247 | 2/1956 | Fed. Rep. of Germany | 354/126 |
| 2715654 | 10/1978 | Fed. Rep. of Germany | 354/145 |

Primary Examiner—L. T. Hix
Assistant Examiner—Thomas H. Tarcza
Attorney, Agent, or Firm—John S. Vale

[57] ABSTRACT

A camera having a foldable flash unit, preferably of the electronic strobe type, wherein the flash unit is movable between an operative erect position and a folded storage position wherein a major portion of the flash unit fits into a conforming recess on the front of the camera housing and the camera and flash housings cooperate to form a protective enclosure for the camera's objective lens and a source of illumination or light output window on the flash unit.

4 Claims, 9 Drawing Figures

FIG. 2

CAMERA WITH FOLDING FLASH UNIT

BACKGROUND OF THE INVENTION

1. Field of the Invention

The present invention relates to the field of photography and, more specifically, to cameras having a built-in flash unit that is movable between erect and storage positions.

2. Description of the Prior Art

With the development of low cost, automatic, electronic flash units and faster color film, the once clear boundary between ambient light and flash photography is becoming somewhat blurred. Increasingly photographers are using supplemental flash illumination in a daylight photographic situation to soften shadow areas or improve image sharpness with the flash unit's "stop action" capability.

In response to this trend, photographic manufacturers are producing more cameras having built in electronic flash units.

Another prevailing trend is to make such cameras as compact and light weight as possible. One weight-saving technique is to eliminate the need for an accessory camera case that provides protection for the camera's optical elements or other delicate exposure control devices including the light output window of the flash unit. Folding cameras that have functional camera housing sections which also serve to cover the optical elements in a protective manner when the camera is folded are well-known in the prior art. For example, see commonly assigned U.S. Pat. No. 4,132,471 wherein a housing section forming an imbibition chamber for a self-developing film unit also serves as a lens cover when the camera is folded. Also, commonly assigned U.S. Pat. No. 4,085,414 discloses a folding self-developing camera in which the lens housing folds into a recess on the forward part of the camera so that sections of the camera housing forming the recess serve as a lens cover. It will be noted, however, that the flash unit on top of the lens housing would not receive such protection when the camera is folded. For an example of a camera that has a forward recess for receiving the lens housing and a trailing end recess for receiving a rangefinder or flash unit, reference may be had to commonly assigned U.S. Pat. No. 3,589,253. Because these cameras fold, the camera designer has a great deal of flexibility in being able to provide protection for the exposure elements and the flash unit.

In non-folding or solid body cameras the designer's choices are more limited. For example, U.S. Pat. No. 3,286,611 discloses a box-type camera having a recess at one end for mounting a pivoting flash unit. In the non-operative folded configuration the camera body and flash housing cooperate to protect the reflector. However, the lens is not protected by the folding flash housing and thus would require a separate lens cap or camera case. Provisions are made for automatically electrically disconnecting the flash unit when it is pivoted to its storage position. Also see U.S. Pat. No. 2,688,071 for a similar camera design.

U.S. Pat. Nos. 2,388,995; 2,871,775; and 3,240,923 disclose cameras in which the reflector of a flash unit mounted thereon pivots to a storage position in which it protectively covers the objective lens. However, the operator must be sure to manually extract the flash lamp from its socket before the reflector is folded.

U.S. Pat. No. 2,783,696 discloses a number of designs for ever-ready camera cases having a first section for receiving a camera and a second section, generally hinged to the first section, for mounting components of the flash unit. When the case is in the open position the flash unit is located in operative relation to the camera lens, and when it is closed the flash unit serves as a lens cover. It will be noted that the case structure is considerably larger than the camera housing itself and thus the design tends to provide a rather large and heavy structure.

The present invention is directed to providing a folding flash unit on a compact, solid body, self-developing camera having a camera housing shape of the type shown in commonly assigned U.S. Pat. No. 4,072,964.

In contrast to the generally box-shaped camera housing utilized in the solid body camera patents cited above, the shape of this typical self-developing camera is rather complex and unconventional because it utilizes a folded exposure optical path to accommodate a snapshot sized film unit. Unlike the conventional box-type cameras, provisions also are made for housing a pair of pressure-applying rollers and certain roller drive components including an electrical motor and gear train assembly. Thus the camera may be distinguished from a box-type camera in that it includes a forwardly facing lens mounting wall and an apron structure covering the roller assembly which projects forwardly from the bottom portion of the lens mounting wall to the forward end of the camera. The lens mount wall and apron are disposed relative to one another to define a characteristic recess or notch on the upper forward end of the camera.

Therefore it is an object of the present invention to provide a self-developing camera characterized by the forward end recess in its camera housing with a built-in flash unit that is light weight and may be stored on the camera housing without excessively increasing the camera's overall size.

It is yet another object of the invention to provide such a camera wherein the camera housing and flash unit housing cooperate to provide a mutually protective enclosure for the exposure components and flash output window thereon without having to resort to adding extra camera structure that serves no other function than to provide such protection. Other objects of the invention will, in part, be obvious or will, in part, appear hereinafter.

SUMMARY OF THE INVENTION

The present invention provides a camera having a foldable flash unit, preferably of the electronic strobe type, wherein the flash unit is moved between an operative erect position and a folded storage position where certain wall surfaces of the camera housing and flash unit housing cooperate to form an enclosure for protectively covering the camera's objective lens and a source of illumination or light output window on the flash unit.

The camera housing is defined, at least in part, by a plurality of camera housing wall exterior surfaces including a forwardly facing lens mount wall surface and an apron wall surface extending forwardly from a bottom portion of the lens mount wall surface in cooperation therewith to define a camera housing recess. The objective lens is mounted on the camera housing such that its optical axis is directed outwardly from the lens mount wall surface. The flash unit housing is defined, at least in part, by a plurality of flash unit housing wall exterior surfaces including an illumination source face surface and an adjacent rearwardly extending bottom wall surface. A source of illumination, such as a flash output window, is mounted in the flash unit housing so that its light output is directed outwardly from the illumination source face surface. Means are provided for coupling the flash housing to the camera housing for movement relative thereto between an operative erect position and a folded storage position wherein a major portion of the flash housing fits into the camera housing recess to form the enclosure for protectively covering the lens and illumination source. The flash housing and camera housing are configured such that certain exterior walls of the flash housing are substantially flush with adjacent camera housing walls, when the flash unit is folded, to provide an aesthetically pleasing design and also eliminate as many abrupt transition surface changes as possible to enhance the portability of the camera so that it will not snag on clothing when being carried. This configuration also makes the camera easier to pack in a travel bag or suitcase.

The camera embodying the present invention is also provided with a simple but effective system for releasably latching the flash unit in both the erect and storage positions without the user having to manually set the latch or make any adjustments thereto. In a preferred embodiment, the latch system is provided by integrally molded latching cams, position stops, and a cooperating cam follower device. An alternative embodiment is disclosed wherein the flash unit is automatically electrically disconnected when it is moved away from the erect position to prevent the flash unit storage capacitor from being charged unless the flash unit is in the erect position. In a preferred embodiment, the camera logic control system inhibits a cycle of camera operation until the flash unit capacitor is fully charged. Thus when the flash unit is in a position other than the erect position, operation of the camera, other than a dark slide eject cycle, is prevented.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
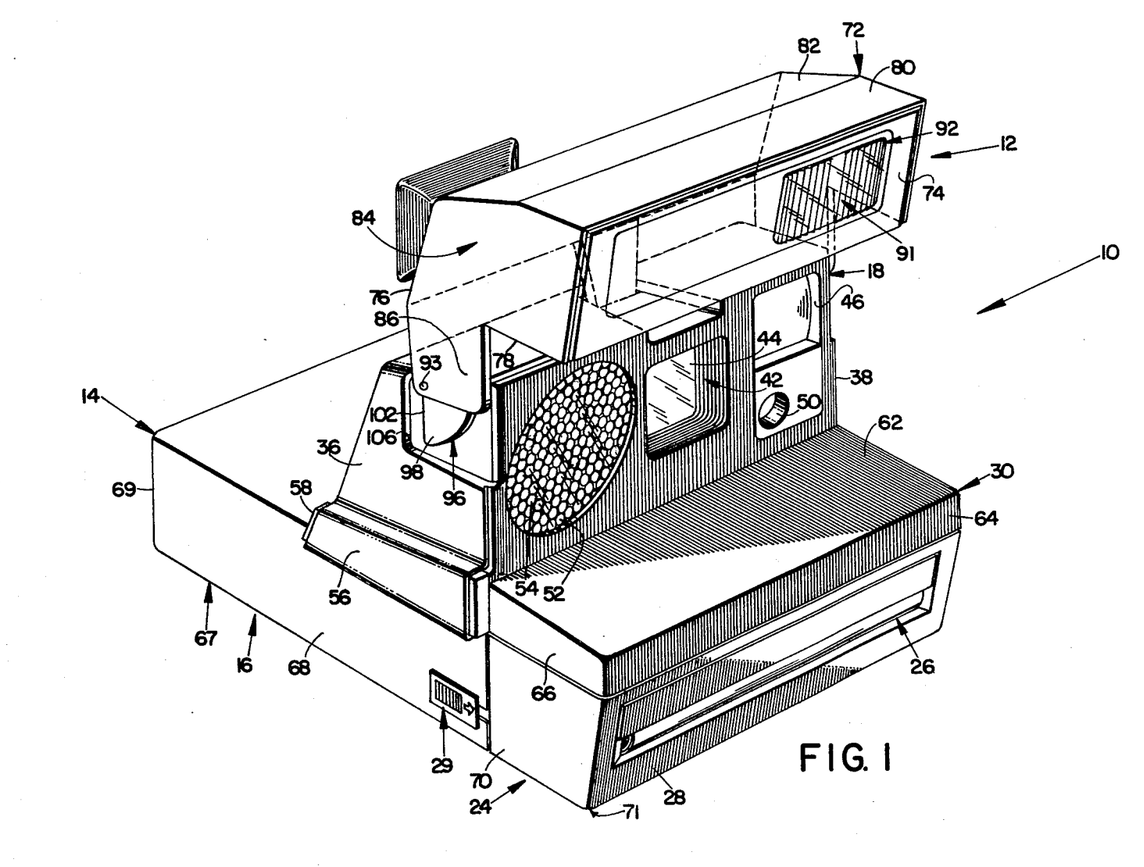
FIG. 1 is a left front perspective view of a camera embodying the present invention showing its foldable flash unit in an operative erect position.
Figure 2:
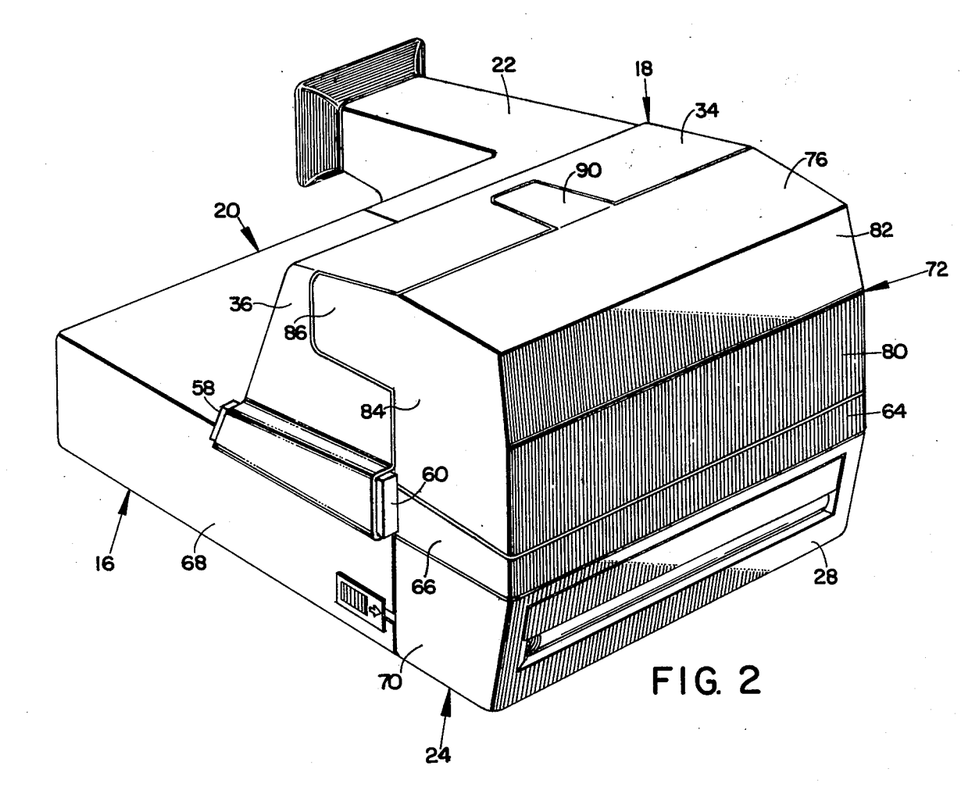
FIG. 2 is similar to FIG. 1 but shows the flash unit in its nonoperational storage position.

The present invention provides a compact camera 10 having a foldable flash unit, such as the illustrated electronic strobe type unit 12, that is movable between an operative erect position shown in FIG. 1 wherein unit 12 is positioned to direct its light output into the camera's optical field of view for providing supplemental illumination to facilitate exposure, and an inoperative storage position, shown in FIG. 2, wherein unit 12 nests over the forward portion of camera 10 and cooperates with selected later-to-be-described portions thereof to form a protective enclosure for the camera's optical elements, optional ranging transducer, and a light output window of the flash unit 12.

The illustrated camera 10 is of the compact, highly automated self-developing type utilizing a reflex or folded exposure optical path, but the inventive concepts to be described herein may be used on any type of camera or photographic apparatus without departing from the scope of the present invention.

Camera 10 includes a camera housing 14 that is preferably, for the most part, of molded plastic construction and is defined by a plurality of integrally molded generally planar wall sections and certain, later-to-be-described, attachable camera housing sections.

As best shown in FIGS. 1 and 2, camera housing 14 includes a generally parallelepiped base section 16 having a hollow chamber therein for receiving a self-developing film pack holding a plurality of self-developing film units along with a flat battery for powering the camera's electrical system. Optionally, camera 10 may include a storage chamber for a separate battery or electrical power source thereby eliminating the need for providing the battery in the film pack. For a representative example of a film pack that may be used in camera 10, see commonly-assigned U.S. Pat. No. 3,877,045.

Positioned over the front or forward end of base section 16 is an upper forwardly facing housing section 18 for mounting and housing many of the camera components associated with the initiation and control of a film exposure and processing cycle of operation. Behind housing section 18 and located over the rearward portion of base section 16 is an exposure chamber defining section 20 which in the illustrated embodiment includes a rearwardly extending viewfinder lens tube extension 22 aligned with a later-to-be-described viewfinder station on the right-hand side of component housing section 18.

Pivotally coupled to the forward end of base section 16 is a film loading door and processing roller mounting housing section 24 that is movable between the illustrated operative position wherein it locates a pair of pressure-applying rollers in line with a film exit slot of a film pack in section 16 and defines a downwardly inclined film exit path of travel, on the exit side of the rollers, along which a film unit is advanced to the exterior of camera 10 through an elongated film exit slot 26 formed in a front end wall 28 of housing section 24.

In response to moving a slide latch button 29, on the left side of base section 16, forwardly, housing section 24 is unlatched and may be pivoted downwardly (in a clockwise manner as viewed in FIGS. 1 and 2) to assume its inoperative or open position wherein it unblocks an open front end of the film pack receiving chamber for loading a full film pack or removing an empty one.

Extending forwardly of the lower portion of component housing section 18 and over the top of loading door section 24 is an apron housing section 30 that serves to protectively cover a plurality of internal camera structural elements and components, preferably including a small electrical motor for driving the film processing rollers and a variety of other movable components including a film advancing pick mechanism and an optional film counter wheel.

Because the present invention is primarily directed to the structural aspects of the camera housing and flash unit and how these two structures cooperate in the erect and storage positions, some time will be taken to describe the pertinent structural features of these components in detail prior to describing a cycle of camera operation.

An important aspect of the invention relates to how the exterior surfaces of folded flash unit 12 are positioned relative to adjacent corresponding camera housing surfaces. Therefore, the wall sections of the camera housing and flash unit will be described in terms of their exterior surfaces.

Figures 3, 4, 5:
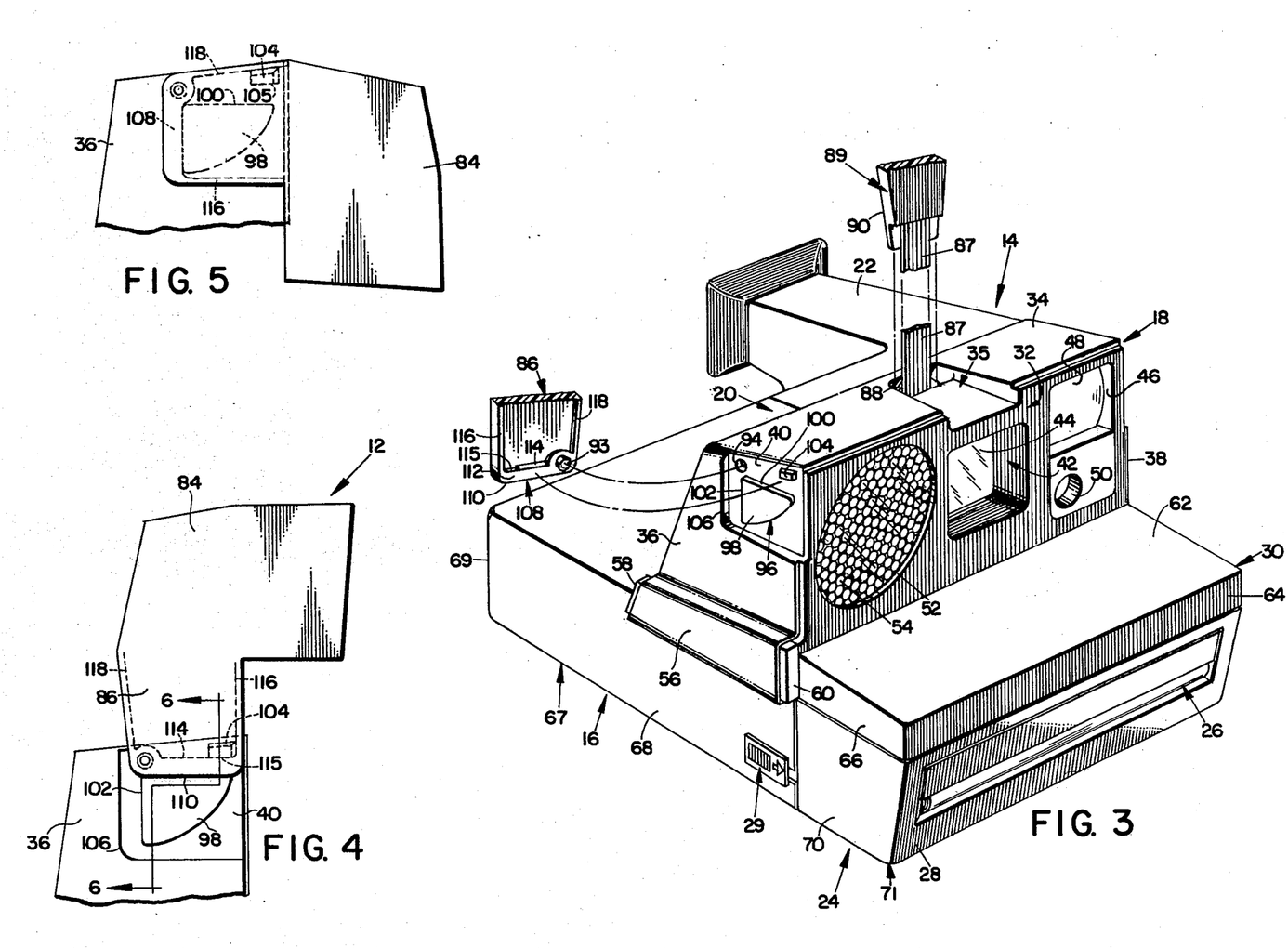
FIG. 3 is a left front perspective view of the camera housing with the flash unit removed but showing selected portions thereof in exploded fashion.
FIG. 4 is a left elevational view of a portion of the camera showing the flash unit in the erect position with selected latching structure shown in dotted lines.
FIG. 5 is similar in some respects to FIG. 4 but shows the flash unit in the storage position.
Figure 6:
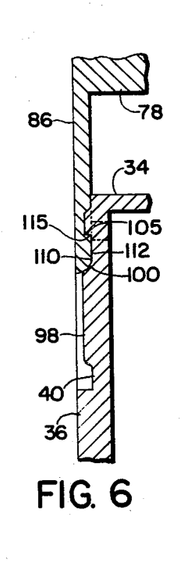
FIG. 6 is a cross-sectional view, taken along lines 6—6 of FIG. 4 to show selected portions of the latching structure for the flash unit.

With reference to FIG. 3, exposure control component housing section 18 is defined, at least in part, by a forwardly facing lens mount wall or front surface 32; a top wall surface 34 extending rearwardly from the upper edge of surface 32 and having a central forwardly facing depression 35 therein extending part way down front surface 32 for receiving a later-to-be-described component of the flash unit 12; and a pair of oppositely spaced side wall surfaces 36 and 38 joining the corresponding lateral edges of surfaces 32 and 34 and each having a recessed or depressed flash unit mounting section 40 therein adjacent the intersections of surfaces 32 and 34.

Front surface 32 is formed with a plurality of integral apertures that provide access for components mounted within housing section 18. These include a centrally disposed aperture 42 for a variable focus objective or picture-taking lens 44 mounted such that its optical axis is substantially normal to surface 32; a viewfinder lens aperture 46 aligned with the viewfinder extension 22 and providing a mounting frame for a front lens 48 of a Galilean-type viewfinder; a photocell aperture 50 located below aperture 46 and providing access to the window (not shown) of an exposure control photocell; and, on the opposite side of lens aperture 42, a transducer aperture 52 providing access for an ultrasonic energy transducer 54 forming part of an automatic lens focusing system. While the illustrated camera includes such a focusing system, more fully described in commonly-assigned U.S. Pat. No. 3,522,764, it is considered to be optional and may be eliminated from camera 10 without departing from the scope of the present invention.

The rear of housing section 18 is closed by the exposure chamber defining section 20 having an inclined mirror therein in alignment with objective lens 44 for reflecting image forming light passing through lens 44 downwardly to the camera's focal plane which is coincidental with the forwardmost film unit in a film pack located in base section 16. Thus the illustrated camera includes a directviewing viewfinder system but uses a folded or reflex optical path for exposure. Other exposure control components that are located in housing section 18 include a shutter and exposure aperture defining mechanism, a film counter mechanism and various electronic circuit modules for controlling a cycle of camera operation. For representative examples of components and their arrangements suitable for use in camera 10, see commonly assigned U.S. Pat. Nos. 3,979,762; 4,040,072; and 4,052,728.

Integrally formed with the lower portion of side wall surface 36 and extending outwardly therefrom is a longitudinal actuator mounting tube 56 having a rearwardly-facing push button type switch actuator 58 at the trailing end and an oppositely disposed forwardly facing push button type slider actuator 60 at its forward end. As will be described later, switch actuator 58 is operative to connect flash unit 12 to a battery in the film pack for charging the flash unit's electrical storage capacitor. Thereafter, slider actuator 60 is pushed to initiate an automatic cycle of camera operation including film exposure and its subsequent processing.

The apron housing section 30 is defined by an upper apron surface 62 that extends forwardly from the base of front wall surface 32 and slopes slightly downwardly therefrom; a front end apron wall surface 64 that depends from a forward edge of surface 62 and is substantially flush with the upper portion of front or forward end wall surface 28 of loading door section 24; and a pair of oppositely spaced side wall surfaces 66 that join the corresponding lateral edges of surfaces 62 and 64.

The base section 16, located under housing sections 18 and 20, is defined by a bottom wall surface 67; a pair of oppositely spaced lateral side wall surfaces 68; and a trailing end or rear wall surface 69.

Forwardly of base section 16 and under apron section 30, the loading door section 24 is defined by the previously-noted front end wall surface 28; a pair of oppositely spaced lateral side wall surfaces 70 and a bottom wall surface 71.

It will be noted that the base section side wall surfaces 68 and the corresponding side wall surfaces 36 (or 38), 66 and 70 of housing sections 18, 30 and 24, respectively, all are generally planar and lie in substantially the same imaginary planes. Only the depressed flash unit mounting areas 40 on side wall surfaces 36 and 38 and the outwardly-extending actuator mounting tube 56 on surface 36 lie outside of these imaginary side wall planes. The planar relationship of these side wall surfaces is being noted here because the imaginary planes will be used later on in the disclosure to clearly define the boundaries of a flash unit storage zone on the forward part of camera housing 14 in front of surface 32 over the apron surface 62.

The illustrated flash unit 12 is an electronically-controlled strobe unit for providing supplemental artificial illumination in the camera's field of view to facilitate exposure. It includes a flash unit housing 72 and various strobe unit components therein including a storage capacitor, adapted to be charged from the battery in the film pack, a gas discharge tube serving as the source of artificial illumination, and flash control circuits for regulating the charging of the capacitor and controlling the application of the stored charge to the flash tube. In a preferred embodiment, flash unit 12 is of the quench type that is actuated in time relation to the operation of the camera shutter mechanism in housing section 18. During the film exposure phase the photocell circuit of camera 10 evaluates the reflected light level of the scene to be photographed on an integrating basis, and, at a predetermined light level consistent with exposure parameters, provides a trigger signal that quenches the gaseous discharge light output of flash unit 12. The flash unit housing 72 is preferably of molded plastic construction and is defined by a plurality of generally planar wall sections which will be described herein in terms of their exterior surfaces.

These wall section surfaces include a forwardly facing front or forward end wall surface 74; an oppositely spaced rear or rearward end wall surface 76; a bottom wall surface 78 joining the bottom edges of surfaces 74 and 76; a top wall surface 80 extending rearwardly from the top edge of front surface 74 in substantially normal relation thereto; an inclined wall surface 82 joining the rear edge of the surface 80 and the top edge of rear surface 76; and a pair of oppositely spaced side wall surfaces 84 joining the corresponding lateral edges of surfaces 74, 76, 78, 80, and 82 and each further including a rearwardly disposed depending mounting leg section 86 extending below bottom wall surface 78.

Being of molded plastic construction, the mounting legs 86 are somewhat resiliently displaceable from their illustrated unstressed normal depending position. In this unstressed state, the interior sides of legs 86 are spaced apart a suitable distance to at least partially overlap the sides of housing section 18 and fit over the depressed mounting section surfaces 40 of the housing side wall surfaces 36 and 38. When so positioned, the exterior surfaces of the mounting legs 86 are substantially flush with their corresponding side wall surfaces 36 and 38.

The various electrical and electronic components of flash unit 12 are electrically coupled to the control circuitry of camera 10 by means of a multiple wire flex cable 87 exiting from the top of component housing section 18 through an opening 88 at the trailing end of recess 35. In order to protectively cover cable 87, the flash unit 12 preferably includes a rigid molded plastic cable cover element 89 depending from the rear and bottom flash housing surfaces 76 and 78. From FIG. 2, it will be seen that cover 89 is adapted to fit into the conforming aperture 35 on the top of housing section 18 with the exterior or rear surface 90 of cover 89 in substantially flush relationship with top wall surface 34. Cover 89 is formed as a tube-like structure having a rectangular cross-section channel therethrough for admitting the passage of cable 87 into flash unit housing 72.

As best shown in FIG. 1, the flash tube is mounted in flash unit housing 72 so that its source of illumination or light output window 91 is aligned with a corresponding aperture 92 near the right-hand end of front surface 74. The light output of the source is therefore directed outwardly from the front surface 74 along a light output axis that is substantially normal thereto. In a preferred embodiment, the light output window 91 includes a plurality of vertically disposed prismatic lens elements for directing the light towards the field of view of camera objective lens 44 when the flash unit 12 is in its operative erect position.

The means for coupling flash unit 12 to camera 10 for movement between the erect position of FIG. 1 and the folded or storage position of FIG. 2 includes the mounting legs 86; a pair of mounting posts 93 each preferably integrally molded on its corresponding leg 86 on the interior side thereof near the bottom rear corner and extending inwardly therefrom; and a pair of corresponding mounting holes 94, for receiving the mounting posts 93, each preferably being integrally formed with its corresponding side wall surface depression 40 near the upper rearward corner. When so connected, the legs 86 are disposed in their neutral or unstressed condition. However, they have enough resilience so that they may be resiliently displaced outwardly to position the posts 93 over their corresponding mounting holes 94 whereupon the legs 86 readily snap into their unstressed coupled position.

Camera 10 includes means for releasably latching the flash unit 12 in both the erect and storage positions. The latching means include a latching cam and stop arrangement associated with each of the recessed side wall mounting section surfaces 40 and corresponding cam follower and latch engaging structure on each of the interior sides of the mounting leg sections 86.

As best shown in FIGS. 3, 4, 5 and 6, a quarter sector latching cam 96 is preferably integrally molded with each side wall of housing 18 so that it extends outwardly from surface 40 within the depressed mounting section but still is recessed somewhat from the side wall surface 36 (or 38). Cam 96 includes a quarter sector cam face 98; an upwardly facing top or erect position beveled latching cam face 100 sloping downwardly from surface 40 to cam face 98; and a rearwardly facing beveled cam latching face or surface 102 having a similar bevel angle to cam surface 100. Also forming part of the latching structure on mounting section 40 is an erect position stop tab or rib 104 having a flat bottom surface 105 extending outwardly from surface 40 over the leading end of beveled cam surface 100 in predetermined spaced relation thereto and a storage position stop 106 defined, in the illustrated embodiment, as a substantially right angle surface disposed in normal relation to side wall surface 36 (or 38) and surface 40. Stop surface 106 conforms in shape and size to the geometry of the forward and bottom edge portions of the mounting leg 86.

The cooperating latching structure on each of the mounting legs 86 includes an integrally molded cam follower arm 108 disposed on the interior side of leg 86 along its bottom edge and having the mounting post 93 integrally molded therewith near its trailing end. Follower arm 108 includes a bottom erect position beveled follower face or surface 110 sloping downwardly from the interior to the exterior sides of leg 86 and having the same angle as its corresponding erect position latching cam surface 100 on cam 96. Follower arm 108 also includes an interior vertically disposed planar cam follower surface 112, having mounting posts 93 extending inwardly therefrom, and a top or upper beveled follower latch face including a rear beveled portion 114 that slopes at the same angle to its corresponding storage position cam latch face 102 on cam 96 and a flat forward portion 115 for engaging the flat erect position stop surface 105. Each leg 86 also includes a forward vertically disposed rib 116 joining the leading end of follower arm 108 and an oppositely spaced rear or trailing end upstanding rib 118 joining the trailing end of follower arm 108. It will be noted that the interior surface of each leg 86 above follower arm 108 and between the vertical ribs 116 and 118 is depressed or recessed to accommodate the raised latching cam 96 when the flash unit 12 is in its folded storage position.

With the flash housing 72 operatively coupled to the camera housing 14 as previously described, the flash unit 12 is located in its erect position as best shown in FIGS. 1 and 4. When so located, the mounting legs 86 are in their unstressed state, the underside beveled follower surface 110 engages and rests on its complementary corresponding erect position cam face 100 and the flat forward portion 115 of the upper follower face is in engagement with the underside flat surface 105 of erect position stop 104. Stop surface 105 interacts with follower flat surface 115 to prevent rotation of the flash unit 12, in a counterclockwise direction about post 93, past or beyond the erect position. However, when a clockwise movement or force is manually applied to the flash unit housing 72 by the user, the bottom beveled follower surface 110 slides downwardly along the corresponding beveled cam face 100 flexing the bottom ends of legs 86 and the follower arm 108 thereon outwardly when the moment arm force applied by the user is sufficient to overcome the spring rate force that is inherent in the resiliently displaceable molded plastic legs 86. When such a sufficient force is provided, the interior follower face 112 of arm 108 slides over the cam face 98 as the flash unit housing 72 is moved towards its storage position. As the storage position is approached, the top beveled follower surface 114 becomes aligned in substantially parallel relation with the rear cam latching face 102 allowing the lower ends of legs 86 and arms 108 thereon to move off the cam face 98 and inwardly toward surface 40. This action locates follower surface 114 in facing engagement with its complementary cam face 102 and allows the legs 86 to return to their unstressed state. Also the forwardly facing exterior surface of rib 116 and the bottom follower face 110 engage the storage position stop surface 106 to prevent housing 72 from moving past its folded storage position. Now, the flash unit 12 is releasably latched in its storage position. To unlatch it for movement to the erect position the process is reversed. The flash unit housing 72 is grasped by the user and is moved upwardly to provide the moment arm force to pivot it in a counterclockwise direction about mounting posts 93, the camming action of the beveled surfaces 114 and 102 operate to flex the lower portion of legs 86 outwardly permitting the follower arm 108 to ride up and over the face 98 of cam 96 until the latching elements once again assume the erect position latching configuration previously described thereby returning the legs 86 to the unstressed state.

Figures 7, 8, 9:
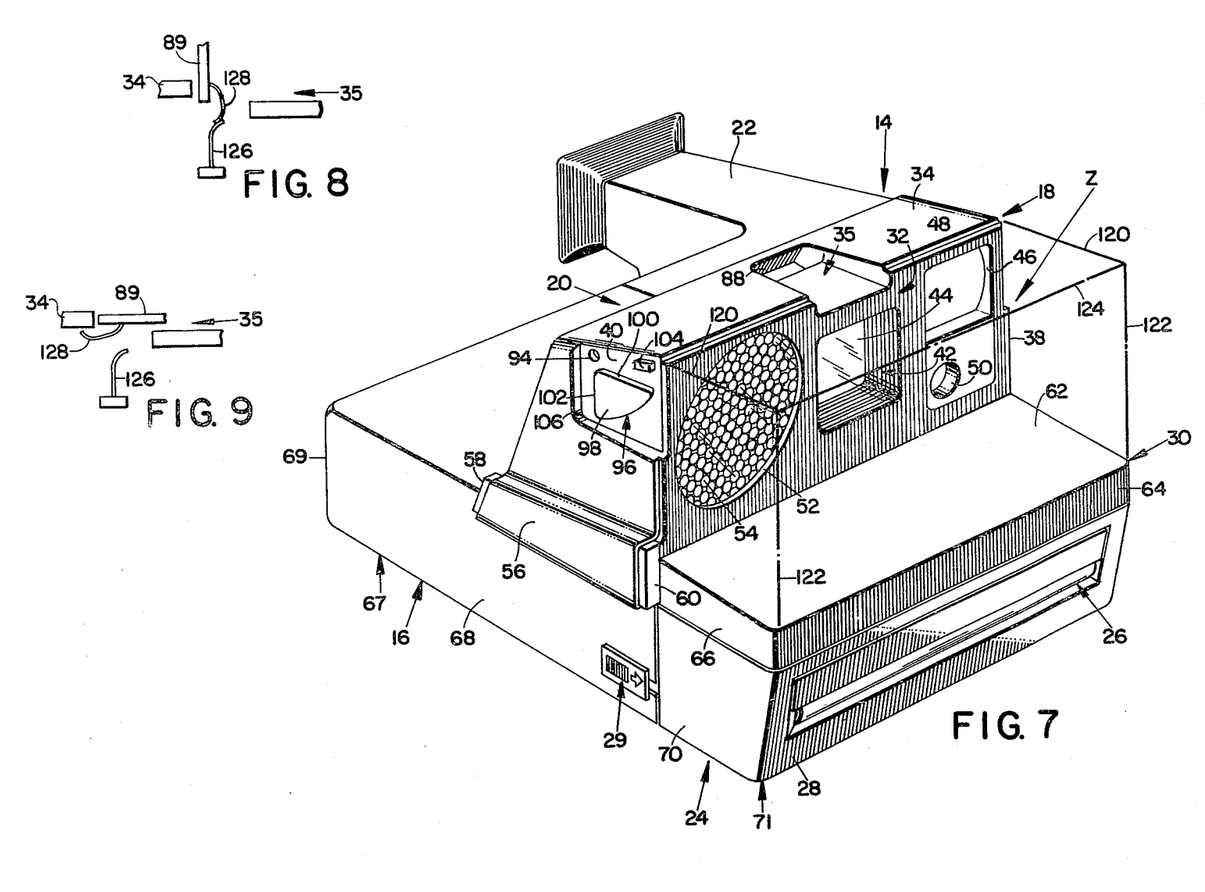
FIG. 7 is similar to FIG. 3 but includes a diagrammatic showing of a plurality of intersecting planes that define the boundary of a flash unit storage zone on the front portion of the camera housing.
FIG. 8 is directed to an alternative embodiment of the invention and diagrammatically shows electrical contacts mounted in the flash unit housing in electrical engagement with corresponding contacts in the camera housing when the flash unit is in its erect position.
FIG. 9 is similar in some respects to FIG. 8 but shows the disposition of the contacts when the flash unit is located in its storage position.

As best shown in FIGS. 2 and 7, the major portion of the folded flash unit 12 is adapted to be located in a storage zone Z on the forward end of camera housing 14 in nesting relation to a camera housing notch or recess defined by the front surface 32 of housing section 18 and the upper apron surface 62. The mounting legs 86 are fully seated in the corresponding conforming side wall mounting sections defined by surface 40 and edge surface 106 and the depending protective cable cover 89 is located in its receiving and storage recess 35.

For aesthetic reasons, and also to provide a compact configuration for camera 10 when flash unit 12 is folded, camera housing 72 is configured and dimensioned to fit wholly within the storage zone Z having its boundaries defined by intersecting imaginary planes that are extensions of the exterior camera housing surfaces surrounding zone Z. That is, zone Z is defined by a rear plane containing camera housing front surface 32; a bottom plane containing apron surface 62; a top plane which is a forward extension of top surface 34, indicated in the drawings by laterally spaced construction lines 120; a front plane which is a vertical extension of the front end apron wall surface 64, indicated by laterally-spaced construction lines 122; and a pair of oppositely spaced side wall surface planes that each lie in substantially the same plane as the corresponding side surfaces 36 (or 38), 66, 68, and 70. The top forward intersection of these imaginary planes is indicated in FIG. 7 by construction line 124. As a result of this construction, the flash unit housing top wall surface 80 is substantially flush with front end apron wall surface 64. The upper flash unit side wall surface 84 is substantially flush with its corresponding apron side wall surface 66 and the mounting leg exterior surface 86 is substantially flush with its corresponding camera housing side wall surface 36 (or 38). Also, the rear exterior surface 90 of the protective cable cover 89 is substantially flush with a top wall surface 34 of housing section 18. It will be noted that the flash unit housing rear wall surface 76 and the adjoining wall surface 82 are configured to lie wholly within zone Z but are not necessarily located in substantially flush relationship with the corresponding imaginary planes defining zone Z. The inclination of surfaces 76 and 82 was made more for aesthetic and styling reasons than for functional or structural considerations. But, it is within the scope of the present invention to provide such a camera 10 wherein the flash unit housing surface 76 is substantially flush with camera housing surface 34 and/or flash unit housing surface 82 is arranged to lie in substantially the same plane as flash unit housing surface 80 and apron surface 64.

Perhaps more important than the considerations given to compactness and an aesthetically pleasing design is the fact that the camera 10 embodying the present invention is configured to provide a protective enclosure for the source of illumination (i.e. flash output window 91) on flash unit 12 and the optical elements on camera housing section 18 including objective lens 44, viewfinder lens 46 and the photocell window (not shown) behind aperture 50. If camera 10 includes the optional automatic focusing system, as illustrated, the protective enclosure will also cover the ultrasonic ranging transducer 54. As best shown in FIG. 2, when the flash unit 12 is in its folded storage position, the front surface 74 of flash unit housing 72, having the light output window 91 thereon, is in adjacent face-to-face relation with the upper apron surface 62. Also, the bottom wall surface 78 of flash unit housing 72 is in adjacent face-to-face relation with front surface 32 of camera housing section 18 and forms a protective cover over the optical elements and transducer. Thus when the flash unit 12 is folded, exterior surfaces of the camera housing 14 and adjacent cooperating surfaces of the flash unit housing 72 functionally cooperate to form the protective enclosure thereby protecting these exposure elements from in advertent damage.

The camera 10, shown in FIGS. 1—7 and described above, is designed so that the flash unit 12 operates during every film exposure cycle. In low ambient light levels it provides a major portion of the exposure illumination. In higher ambient light levels, the light output is quenched earlier so that flash unit 12 operates in a fill flash mode, for example, to soften shadows in portrait work. This approach is economically feasible in terms of battery costs because the electrical energy for charging the flash unit's capacitor comes from the disposable battery provided in each film pack.

To coordinate the operation of flash unit 12 with the other exposure components of camera 10, a logic system is provided for inhibiting the initiation of a film exposure and processing cycle until the storage capacitor of flash unit 12 is fully charged.

In operation, the user opens loading door section 24 and inserts a film pack having a flat battery therein into the camera'receiving chamber. When section 24 is closed, an electrical switch (not shown) forming part of the camera's logic system is actuated and initiates a dark slide eject mode of operation wherein a dark slide covering the film pack's exposure aperture is advanced by the film pick into the bite of the pressure-applying rollers which, in turn, advance it forwardly through the film exit slot 26. The logic system is designed to operate in the dark slide eject mode regardless of the position of flash unit 12. Normally, flash unit 12 would be in the folded storage position when a new film pack is loaded into camera 10 but this is not necessary for the dark slide eject mode.

To prepare camera 10 for a picture taking cycle of operation, the folded flash unit 12 is manually pivoted by the user up to its erect operative position thereby uncovering the exposure components on the front of housing section 18 and positioning the source of illumination or light output window 91 in its proper location to direct the light output therefrom towards the field of view of the objective lens 44. It will be noted that light output window 91 is somewhat off to the side and above the optic axis of objective lens 44 to minimize the well-known "red-eye effect" that commonly occurs when blue eyed people are photographed with color film in a flash mode of operation.

The user grasps camera 10 with his right hand under base section 16 and locates the thumb of the left hand on the flash charge button 58 and the first finger on the oppositely disposed cycle actuation button 60. Sighting through the viewfinder to frame the scene or object to be photographed, he first presses button 58 which causes the logic system to operate in a flash charge mode whereby electrical energy from the battery in the film pack is transferred to the flash unit storage capacitor. In a preferred embodiment, a visual full charge signal is provided in the viewfinder tube. This may be an electrical signal provided by a light-emitting diode or it may be a mechanical signal indicated by a moving lever or flag. Until the storage capacitor is fully charged, the slider actuator 60 is rendered ineffective, by the logic system, for initiating a film exposure and processing cycle.

Still sighting through the viewfinder for framing purposes, the user pushes rearwardly on the slider actuator 60 which moves a mechanical slider in housing section 18 rearwardly to close a cycle start switch that is enabled by the logic system when the flash unit is fully charged.

If camera 10 is equipped with automatic lens focusing, transducer 54 emits ultrasonic ranging signals which are reflected by the subject to be photographed back toward camera 10 where the signals are received by transducer 54. The time difference between the emitted and received signals is translated electronically into a range signal that is used to move lens 44 from a base position to a proper focus position relative to the film plane. Following lens focusing the shutter behind lens 44 begins to open and the flash unit 12 is fired. The photocell circuit evaluates and integrates the scene lighting level and provides a trigger signal to quench the gaseous discharge of the flash tube and close the shutter mechanism. The exposed film unit is then advanced forwardly by the pick into the bite of the pressure-applying rollers which in turn cause the film unit to be advanced therebetween for effecting the discharge and distribution of a fluid processing composition between predetermined layers of the film unit to initiate a well-known development and diffusion transfer process. The rollers also advance the film unit at least partially through the film exit slot 26 where it may be grasped and removed by the user.

While it is very unlikely that the user would sequentially actuate the button switches 58 and 60 while the flash unit 12 is in its folded position, the present invention provides a second or alternative embodiment which includes a mechanism for electrically disconnecting the flash unit 12 from the charging system operable in response to pushing button actuator 58. This system prevents the charging of the flash unit storage capacitor unless flash unit 12 is in its fully erect position. By preventing full charge it automatically, through the logic system, inhibits the ability to initiate an exposure processing cycle by pushing on slider actuator 60. However, this system will not interfere with the dark slide eject cycle so that a film pack may be properly loaded when flash unit 12 is folded.

As best shown in FIGS. 8 and 9, that portion of the flex cable 87 between the camera aperture 88 in the top wall of housing section 18 and the lower end of cable cover 89 is eliminated and replaced with two sets of switch contacts.

As diagrammatically shown in FIG. 8, a first set of contacts 126 located in camera housing 18 exits through aperture 88 so that the terminal ends thereof are located in the recess 35. A corresponding set of contacts 128 depend from the channel opening of cover 89 and are configured to mate with the corresponding terminal contact ends of the corresponding contacts 126 when, and only when, the flash housing 12 is in the fully erect position. As best shown in FIG. 9, the terminal ends are separated when the flash unit 12 is moved from the erect position toward the storage position. Therefore, when flash unit 12 is folded, the contacts 126 and 128 are separated and reside in a non-conductive state thereby electrically disconnecting the electrical components of flash unit 12 from the capacitor charging circuitry in camera housing 14. Thus when flash unit 12 is folded, the charging button actuator 58 is rendered ineffective to initiate a capacitor charging cycle and the logic system therefor inhibits the initiation of an exposure and processing cycle by actuating the slider actuator 60.

While the illustrated flash unit 12 is of the strobe type, it should be understood that it is within the scope of the present invention to provide camera 10 with other types of flash devices such as a folding flash socket assembly for receiving a disposable source of flash illumination such as a multilamp flash array. Such an assembly would include a socket base having the oppositely spaced mounting legs 86 and cover 89 thereon and would be attached to the camera housing in the same manner as flash unit 12.

It can be readily appreciated that this invention may be embodied and practiced in still other ways without departing from the scope or essential character thereof. Therefore, the embodiment described therein is illustrative and not restrictive, the scope of the invention being indicated by the following claims and all inventions which come within the meaning of these claims are intended to be embraced therein.

What is claimed is:

1. A camera having a foldable flash unit comprising:

a camera housing defined, at least in part, by a plurality of camera housing wall exterior surfaces including a forwardly facing lens mount wall surface, an apron wall surface extending forwardly from a bottom portion of said lens mount wall surface and cooperating with said lens mount wall surface to define a camera housing recess and a pair of laterally spaced side wall surfaces extending rearwardly from lateral edges of said lens mount wall surface, each of said side wall surfaces including a flash unit mounting section having a mounting surface;

an objective lens, mounted on said camera housing with its optical axis directed outwardly from said lens mount wall surface, for forming an image of a subject to be photographed in its field of view;

a flash unit housing defined, at least in part, by a plurality of flash unit housing wall exterior surfaces including an illumination source face surface, an adjacent rearwardly extending bottom wall surface and a pair of laterally spaced side walls joining lateral edges of said face and bottom wall surface and each including an integrally formed depending resiliently displaceable mounting leg, said mounting legs being laterally spaced so that a bottom section of each said leg overlaps a corresponding one of said mounting sections when said mounting legs are in an unstressed state;

a source of illumination for illuminating a subject in the field of view of said lens to facilitate exposure and being mounted on said flash unit housing so that light emitted from said source is directed outwardly from said illumination source face surface;

cooperating coupling means, integrally formed with said mounting sections and facing portions of said mounting leg bottom sections and operatively engageable in coupling relation by displacing said mounting legs outwardly and releasing them when aligned with said coupling means on said mounting section to return said mounting legs to said unstressed state, for coupling said flash unit housing to said camera housing for pivotal movement relative thereto between an erect position, wherein said illumination source is located to direct light therefrom toward said lens field of view, and a folded storage position wherein a major portion of said flash unit housing fits into said recess, said lens mount wall surface and said bottom wall surface are in face-to-face relation, said illumination source face surface and said apron wall surface are also in face-to face relation, and these surfaces and at least some of the other of said plurality of exterior surfaces of said camera housing and said flash unit housing cooperate to form an enclosure for protectively covering said lens and said illumination source; and cooperating latching means, integrally formed with at least one of said mounting sections and a corresponding one of said mounting legs, for automatically releasably latching said flash unit housing in each of said erect and storage positions, said latching means including, on said one mounting section, a latching cam having separate erect and storage position latching cam faces thereon, an erect position stop spaced from said erect position cam face and a storage position stop spaced from said storage position cam face, and, located on said corresponding mounting leg bottom section, a cam follower having oppositely disposed erect and storage position follower latching faces thereon so that when said flash housing is in said erect position said follower is located between said erect position cam face and stop with said erect position follower face in engagement with said erect position cam face and said storage position follower face in engagement with said erect position stop and, when said flash housing is in said storage position, said follower is located between said storage position cam face and stop with said storage position follower face in engagement with said storage position cam face and said erect position follower face is in engagement with said storage position stop, said latching cam being formed to project outwardly from said mounting surface and including a raised exterior cam face that is substantially parallel to said mounting surface, said erect and storage position latching cam faces extending between edges of said exterior cam face and said mounting surface, said cam follower being configured to be positioned in side-by-side relation to said latching cam when in said erect and storage positions and to be displaced outwardly for movement over said raised cam face when moved between said erect and storage positions and said one resiliently displaceable mounting leg being unstressed and locating said follower in said side-by-side relation when said one leg is in said erect and storage positions and resiliently deflecting outwardly to allow said follower to follow the contours of said latching cam and pass over said raised exterior cam face when moved between said erect and storage positions while maintaining said coupling means thereon in operatively coupled relation with said cooperating coupling means on said one mounting section.

2. The camera of claim 1 wherein said erect and storage position latching cam faces are beveled at a given angle with respect to said mounting surface and said raised cam face and said cooperating erect and storage position follower faces are beveled at conforming angles to allow said follower to cam over said latching cam.

3. The camera of claim 2 wherein said erect position stop includes a flat engagement surface and said beveled storage position follower latching face includes a flat portion that engages said engagement surface when said flash unit housing is in said erect position to prevent said follower from being displaced outwardly beyond said erect position stop and thereby not allowing said flash unit housing to pivot past its said erect position.

4. The camera of claim 1 wherein said mounting surface is depressed inwardly from said camera housing side wall surface and a transition surface joining said side wall and mounting surfaces serves as said storage position stop.

* * * * *